United States Patent [19]

Urban

[11] 4,332,836
[45] Jun. 1, 1982

[54] PROCESS FOR PRODUCING COMPOSITE INSULATING MATERIAL

[75] Inventor: Raymond C. Urban, Ballston Lake, N.Y.

[73] Assignee: General Electric Company, Schenectady, N.Y.

[21] Appl. No.: 185,734

[22] Filed: Sep. 10, 1980

[51] Int. Cl.³ .............................................. B05D 3/06
[52] U.S. Cl. .................................... 427/44; 427/54.1; 427/116
[58] Field of Search ..................... 427/44, 54.1, 116; 428/454

[56] References Cited

U.S. PATENT DOCUMENTS

| | | | |
|---|---|---|---|
| 2,829,191 | 4/1958 | Rogers | 427/116 |
| 3,398,210 | 8/1968 | Plueddemann et al. | 260/29.6 RB |
| 3,708,296 | 1/1973 | Schlesinger | 204/159.18 |
| 4,046,938 | 9/1977 | Torossian et al. | 428/454 |
| 4,072,792 | 2/1978 | Araki et al. | 427/44 |
| 4,091,141 | 5/1978 | Harris | 427/54.1 |
| 4,138,255 | 2/1979 | Crivello | 204/159.19 |

OTHER PUBLICATIONS

Plueddemann et al., "J. Am. Chem. Soc." V 81, pp. 2632–2635, (1959).

Primary Examiner—John H. Newsome
Attorney, Agent, or Firm—Hedman, Casella, Gibson & Costigan

[57] ABSTRACT

A process for the production of a composite insulating material is described. A mica paper is coated with a curable admixture of resin material and crosslinking agent. The coated tape is then passed through a zone of radiant energy to effect at least partial cure of the resin. Reinforcing sheet(s) may also be laminated to the paper through the resin to produce multilayer materials.

10 Claims, 1 Drawing Figure

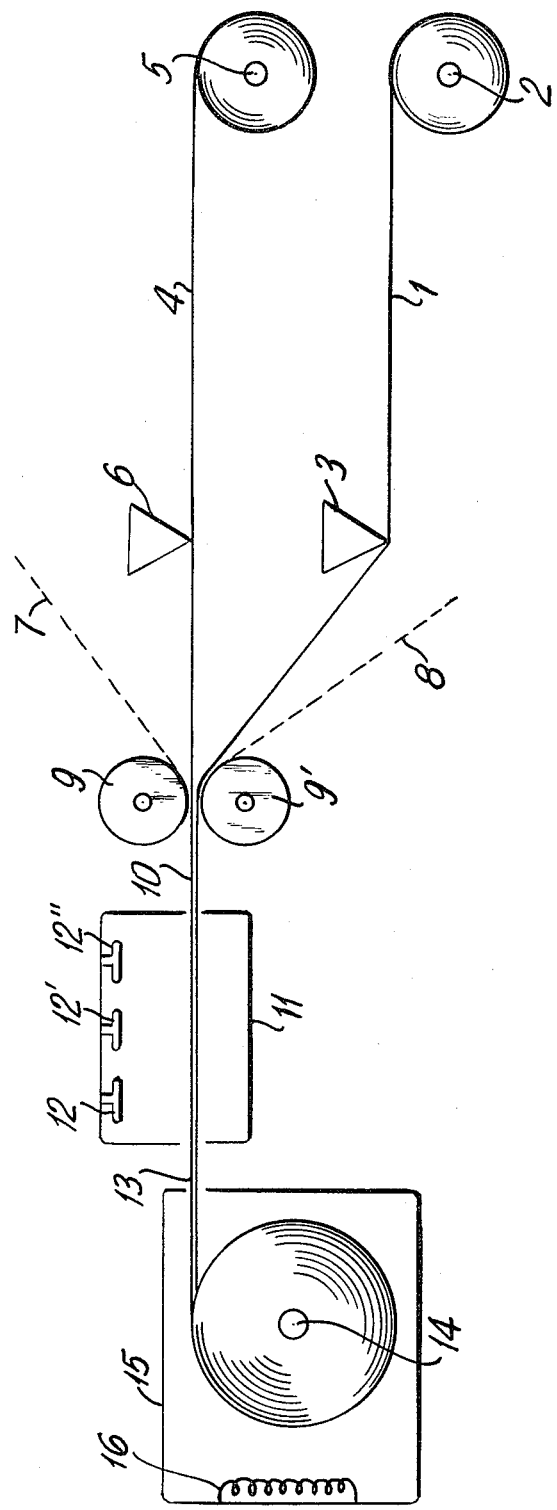

PROCESS FOR PRODUCING COMPOSITE INSULATING MATERIAL

BACKGROUND OF THE INVENTION

Composite insulating materials (generally tapes or mats) containing one or more plies of mica paper are well known commercial products. Mica and mica paper are heat resistant up to at least 500° C. and have excellent voltage endurance and corona resistance. Consequently, the advantages of such materials for high-voltage situations are apparent.

The mica paper is utilized in coated or laminate form. These additional layers are employed to improve its physical integrity and other desirable properties. Polymer coating may, for example, be applied to one or both sides of the paper. Certain such polymers may also be utilized as a binder in composite materials made by laminating separate mica paper sheets together and/or to supporting plies of glass cloth, cellulosic paper or other common reinforcing sheet materials.

These composite mica paper materials containing coatings and/or laminates have proven particularly efficatious. They can be provided as tape or wrapper materials readily applied over the structure to be insulated. This greatly facilitates their handling.

A drawback of these composite materials has been the difficulty of their production. Flow of resin after initial application may result in uneven coatings and/or spillage. Also it is often difficult to obtain good layer-to-layer adhesion, particularly while retaining flexibility in the material.

INTRODUCTION TO THE INVENTION

In accordance with the present invention, the drawbacks of prior art processes are substantially overcome. Composite insulating materials are produced by applying a coating of a curable admixture of resin material and cross-linking agent to the mica paper. The coated paper is then passed through a zone of radiant energy sufficient to at least partially cure the resin material.

In the present process, curing may be carefully controlled to moderate resin flow and ensure good adhesion. The process may further involve simultaneous lamination of reinforcing layers and permits continuous operation for maximum efficiency of production.

DESCRIPTION OF THE FIGURE

The FIGURE is a schematic depiction of a process of the present invention.

DESCRIPTION OF THE INVENTION AND FIGURE

The mica paper forming the base for the present composite insulating materials is entirely conventional. Such paper is readily available commercially and is produced on modified paper-making machines. It is normally composed of overlapping platelets of mica smaller than 1 mm in their largest dimension. More specifically, the paper is generally at least 0.5, preferably from 1 to 4, mils in thickness and the platelets predominently, or preferably essentially exclusively, within a range of from 20 to 100 mesh in size.

The mica paper is provided with a coating of a curable admixture of resin material and cross-linking agent. Application is readily performed by a variety of conventional techniques. Most conveniently a homogeneous admixture of the two components is placed on the paper and then spread to an even thickness. The coating is normally from about 1 to 10, preferably 2 to 5, mils in thickness.

The resin material of the coating admixture may be any suitable polymer. Many are well known and readily available. Included, for example, are various epoxy resins. These curable resins include oligomeric or polymeric epoxy materials containing one or a plurality of epoxy functional groups. For example, those resins which result from the reaction of bisphenol-A(4,4'-isopropylidenediphenol) and epichlorohydrin, or by the reaction of low molecular weight phenol-formaldehyde resins (Novolak resins) with epicholorhydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl arylate, glycidyl methacrylate, styrene oxide, glycidyl arylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the catalysts described more fully below are epoxy-siloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 81 632-5 (1959). As described in the literature, epoxy resins can also be modified in a number of standard ways such as reactions with amines, carboxylic acids, thiols, phenols, alcohols, etc. as shown in U.S. Pat. Nos. 2,935,488; 3,235,620; 3,369,055; 3,379,653; 3,398,211; 3,403,199; 3,563,850; 3,567,797; 3,677,995; etc. Further examples of epoxy resins which can be used are shown in the Encyclopedia of Polymer Science and Technology, Vol. 6, 1967, Interscience Publishers, New York, pp 209-271.

Another class of suitable resins is the unsaturated polyesters. These resins are most commonly prepared by condensation of unsaturated poly-carboxylic acids, such as maleic, fumaric, aconitic and the like (or, if available, the correspnding anhydrides) with polyhydric alcohols, such as ethylene glycol, butanediol and the like. Besides such vinyl unsaturated acids, the polyester resins may also include saturated and/or aromatic acid comonomers.

In conjunction with such resins, the admixture must also contain a cross-linking agent. Normally this agent is a vinyl monomer. Any compound having a polymerizable carbon-carbon double bond may be employed. Representative are ethylene and styrene.

These two components of the coating admixture may be in widely varient proportions. Ordinarily, however, the cross-linking agent is present in at least a stoichrometic amount, based on the degree of vinyl unsaturation on the polyester resin.

In addition to the foregoing resin and cross-linking agent, the coating admixture may contain a variety of optional components. These most often include catalysts which will initiate or accelerate curing. These catalysts are normally stable or semi-stable compounds capable of generating free radicals upon exposure to radiant energy.

Such catalysts are well-known in the art. Representative, but hardly limitative, are the peroxides—such as benzoyl peroxide—aromatic diazonium salts—such as those described in U.S. Pat. No. 3,703,296 of Schlesinger—and aromatic onium salts of Lewis Acids—such as those described in U.S. Pat. No. 4,138,255 of Crivello. Combinations of such catalysts may also be employed for their composite advantages.

Commonly the admixture also contains a stabilizer or cure inhibitor such as hydroquinone or benzoquinone. Small amounts of such additives quench free radicals incidentally generated prior to desired curing and so allow more complete control over the timing and degree of cross-linking.

The coating admixture may also contain other conventional additives for such resin materials. These include viscosity control agents, fillers, dyes and the like. Generally, however, these non-essential components should comprise less than about 20% by weight of the coating admixture.

Once coated with the admixture, the composite may be exposed to radiant energy to initiate resin cure. This is most conveniently performed by passing the tape through a fixed zone where the energy is generated.

Suitable types of radiant energy for curing are well known. They most commonly include electron beams or ultra violet light. As such, the exposure zone may conveniently take the form of an enclosed or partially enclosed volume allowing concentration or focus of the radiant energy onto the surface of the coating.

Electron beam cure can be effected at an accelerator voltage of from about 100 to 1,000 KV. Cure of the compositions is preferably achieved by the use of UV irradiation having a wavelength of from 1849 A to 4000 A and an intensity of at least 5,000 to 180,000 microwatts per $cm^2$. The lamp system used to generate such radiation can consist of ultraviolet lamps such as from 1 to 50 discharge lamps, for example, xenon, metallic halide, metallic arc, such as a low, medium or high pressure mercury vapor discharge lamps, etc. having an operating pressure of from a few millimeters to about 10 atmospheres, etc. can be employed. The lamps can include envelopes capable of transmitting light of a wavelength of from about 1849 A to 4000 A, and preferably 2400 A to 4000 A. The lamp envelope can consist of quartz, such as Spectrosil, or Pyrex, etc. Typical lamps which can be employed for providing ultraviolet radiation arc, for example, medium pressure mercury arcs, such as the GE H3T7 arc and the Hanovia 450 W arc lamp. The cures may be carried out with a combination of various lamps, some or all of which can operate in an inert atmosphere. When using UV lamps, the irradiation flux on the substrate can be at least 0.01 watts per square inch to effect cure of the organic resin within 1 to 20 seconds and permit the cure to be carried on continuously as, for example, in the curing of epoxy-coated steel strip to be taken up at a rate of from 100 to 600 feet per minute.

In many instances, complete cure of the coating admixture on the mica paper is not desired at this early stage of the process. The coated paper may therefore be exposed to only sufficient radiation to effect a partial cure which will, for example, cease resin flow. Completion of curing may then be accomplished at a subsequent process stage.

Such sequential curing may, for example, be employed where a reinforcing sheet is to be laminated to the composite material. While application of such a laminate sheet may occur simultaneous with a coating cure cycle as has already been described, it often takes place between partial cycles.

In such an embodiment, coated mica paper may first be partially cured utilizing radiant energy. This often improves its receptivity to a reinforcing sheet. A conventional sheet may then be brought into contact with, and preferably pressed against, the resin coating. The pressure asserted during this contact assures good adhesion, and further assures a thin composite which is highly efficatious as a tape or wrapper. While it is maintained in contact, the resultant composite may then be subjected to further conditions of cure, either by additional exposure to radiant energy and/or by conventional (such as heat) treatment. Ideally, radiation to effect the final cure will be imposed on the composite tape simultaneously with the compression referred to above. This sequential process of joining the composite layers, initially and partially curing the coating admixture and then finally curing under compression results in minimal problems of resin flow during production and heightened adhesion between layers or plies.

The FIGURE depicts such a continuous multi-step sequential process. In the FIGURE, a web 1 of mica paper is continuously unwound from a storage roll 2. As the web 1 is passed under an applicator 3, a coating (not shown) of curable admixture of resin and cross-linking agent is obtained.

Simultaneously with the foregoing, a second web 4 of reinforcing sheet such as glass cloth is unwound from another storage roll 5. As that web 4 is passed under an applicator 6, it is impregnated with a coating (not shown) of additional curable admixture of resin and cross-linking agent.

Also depicted by dashed lines are webs 7 and 8. These represent further optional plies of, for example, mica paper, reinforcing sheet or other material which, with or without coatings of curable admixture, may be laminated into the present composite.

The coated webs 1 and 4 (and optionally 7 and 8) are contacted by passage between two rollers 9 and 9' set to press the webs together and form an uncured composite material 10.

In the curing zone defined by shielding enclosure 11, the material 10 is exposed to radiant energy emitted by ultraviolet lamps 12, 12' and 12''. By variation of the speed at which the material 10 is advanced, the residence time in enclosure 11 is controlled to effect curing of admixture in the material 10 sufficient to eliminate resin flow. This results in exit of at least partially cured composite material 13 from the enclosure 11.

The composite insulating material 13 is then rewound on a storage roll 14. This roll 14 resides within a second curing zone defined by shielding enclosure 15 containing emitter 16. Emitter 16 provides the energy, for example, heat, electrons or ultraviolet light, sufficient to complete cure of the admixture in the rolled composite material 13. The composite is compressed against roll 14 as it is rewound during this final curing thereby insuring a thin product with good adhesion.

In a preferred embodiment the curable mixture of resin material cures to a pressure sensitive adhesive coating. In this embodiment the cured composite may be adhered to a substrate, or a reinforcing sheet may be adhered to the composite after it has been cured by radiant energy.

While the present invention has been described with reference to particular of its embodiments, it is understood that numerous modifications may be made by those skilled in the art without departing from its scope. For example, resin coatings and/or coatings and laminate sheets can be applied to both sides of the mica paper and/or to the surface of a sheet already laminated to the mica paper. Similarly, a composite material containing only a partially cured resin coating may be applied to the substrate to be insulated, with completion of cure occuring thereafter to hold the material in place. Therefore the appended claims are intended to cover all such equivalent modifications as come within the true scope of this invention.

I claim:

1. A process for the production of a composite insulating tape comprising moving a mica paper tape along its longitudinal axis toward coating and curing stations, coating one side of said mica paper tape with a curable admixture of resin material and cross-linking agent to form a composite insulating tape, and then exposing the composite insulating tape to radiant energy to at least partially cure said admixture while simultaneously advancing said composite insulating tape around a rotating cylindrical member, said rotating cylindrical member compressing said mica paper together with said curable admixture.

2. The process of claim 1, wherein the coated paper is exposed to sufficient radiant energy to completely cure the admixture.

3. The process of claim 2, wherein a reinforcing sheet is contacted with the coated admixture prior to and during exposure to the radiant energy to effect lamination of said sheet to the mica paper.

4. The process of claim 1, wherein the coated paper is exposed to sufficient radiant energy to partially cure the admixture.

5. The process of claim 4, wherein the coated paper containing partially cured admixture is completely cured in a second exposure to curing conditions.

6. The process of claim 5, wherein a reinforcing sheet is contacted with the partially cured admixture prior to and during the second exposure to effect lamination of said sheet to the mica paper.

7. The process of claim 1, wherein the resin is selected from the group consisting of epoxy and unsaturated polyester resins.

8. The process of claim 7, wherein the cross-linking agent is a vinyl monomer.

9. The process of claim 1, wherein the admixture additionally contains a curing catalyst.

10. The process of claim 1, wherein the radiant energy is selected from the group consisting of an electron beam and ultraviolet light.

* * * * *